Sept. 12, 1967 B. S. VILKOMERSON 3,341,655

TRANSISTORIZED PREAMPLIFIER FOR TELEVISION CAMERAS

Filed March 23, 1964

2 Sheets-Sheet 1

INVENTOR.
B. S. VILKOMERSON
BY
W. H. Sprouagle
Attorney

Sept. 12, 1967 B. S. VILKOMERSON 3,341,655

TRANSISTORIZED PREAMPLIFIER FOR TELEVISION CAMERAS

Filed March 23, 1964 2 Sheets-Sheet 2

INVENTOR.
B. S. VILKOMERSON
BY
W. H. Sprague
Attorney

United States Patent Office 3,341,655

Patented Sept. 12, 1967

3,341,655

TRANSISTORIZED PREAMPLIFIER FOR TELEVISION CAMERAS

Benjamin S. Vilkomerson, Camden, N.J., assignor to Radio Corporation of America, a corporation of Delaware Filed Mar. 23, 1964, Ser. No. 353,959
9 Claims. (Cl. 178—7.2)

ABSTRACT OF THE DISCLOSURE

An emitter follower input stage transistor is mounted close to a vidicon target ring. The emitter electrode of a second transistor amplifying stage (to which the emitter electrode of the input stage transistor is coupled) is capacitively coupled back to the collector electrode of the input stage transistor to improve the signal-to-noise ratio of the preamplifier.

This invention relates to amplifiers and particularly to a low noise, wide band transistorized amplifier useful, for example, as a preamplifier for video signals generated in a television camera.

It has been found useful in the past in certain types of television camera systems to use pickup devices of the photoconductive type such as a vidicon. Such a pickup device has been advantageously employed previously in television film cameras and in certain types of color television cameras. Although the video signal derived from a vidicon type of pickup tube is relatively free from noise or other spurious signals the signal current is quite low. In order to maintain a satisfactory signal-to-noise ratio in previous camera arrangements using a vidicon pickup tube it has been found desirable to employ an electron tube, at least in the first amplifier stage. Noise, particularly of a low frequency character, is introduced by an electron tube but not to the same degree as by a transistor. A transistor, however, has certain properties which are superior to those of an electron tube and, hence, it is desirable, if feasible, that advantage be taken of these properties. Such properties are its longer life and greater permanence of operating characteristics, its relative insensitivity to vibration, its lower power consumption and heat generation, its ability to withstand mechanical shock without damage, etc. Its insensitivity to vibration makes a transistor particularly superior to an electron tube when the amplifier is used with a motion picture film camera where the film transport and other mechanism tend to produce microphonic signal disturbances when electron tubes are employed.

In order to produce a video signal from which a desired picture resolution may be obtained it is necessary that any amplifier of the video signal have a relatively great frequency bandwidth. Because the vidicon is essentially a current source having a relatively high impedance the available signal voltage is proportional to the total value of the vidicon output load impedance. Except for the lowest video frequencies the load impedance of the vidicon output circuit is determined by the capacitive reactance of the amplifier input circuit. In the past because of the sensitivity of the vidicon photoconductive surface to heat, the heat generated by a preamplifier tube having high mutual conductance ($G_m$), and the need for good mechanical vibration isolation which the close grid-to-cathode spacing of a high $G_m$ tube necessitates, the usual procedure was to place the preamplifier at some distance from the vidicon and connect it thereto by a shielded cable. The total capacitance, including the grid capacitance and the cable capacitance which the vidicon signal current had to charge determined the obtainable vidicon signal output voltage. Using prior art techniques, it was found that a well designed transistor input stage substituted for the tube preamplifier had approximately the same input capacitance, but the inherently higher internally-generated noise of the transistor input stage, as compared to a good tube, degraded the signal-to-noise ratio characteristic of a camera chain.

It is an object of the present invention to so arrange certain components of a transistorized video signal preamplifier relative to a photoconductive type pickup tube and to so design the preamplifier circuit as to materially reduce the effective capacitive reactance of the input circuit of the transistorized signal preamplifier.

In accordance with a particular embodiment of the invention, the input stage of the transistorized preamplifier is mounted in such close proximity to the target of a photoconductive pickup tube as to require only a very short lead connecting the target to the amplifier input circuit, which, therefore, does not require shielding, thereby to minimize any distributed capacitance associated with the lead. Additionally the output signal target ring of the pickup tube may be electrostatically shielded from any adjacent metallic structures which are required to be operated at ground potential. The output conductor from the input stage transistor also is shielded from any grounded structures between the output of the input stage transistor and the input electrode of a following amplifier stage. To further decrease the effective input circuit capacitive reactance the emitter electrode of an emitter follower stage of the amplifier is capacitively coupled back to the collector electrode of the input stage transistor. By such means it has been found possible to effectively reduce the capacitive reactance of the input circuit of the transistorized preamplifier to about one-third of the capacitive reactance usually present in the input stage of such an amplifier. The noise generated by the input stage transistor, therefore, can be three times as great as that produced by an electron tube without the signal-to-noise ratio of the transistorized amplifier being below that found in an electron tube amplifier.

For a better understanding of the invention reference now will be made to the following description taken in conjunction with the accompanying drawings of which:

Figure 1:
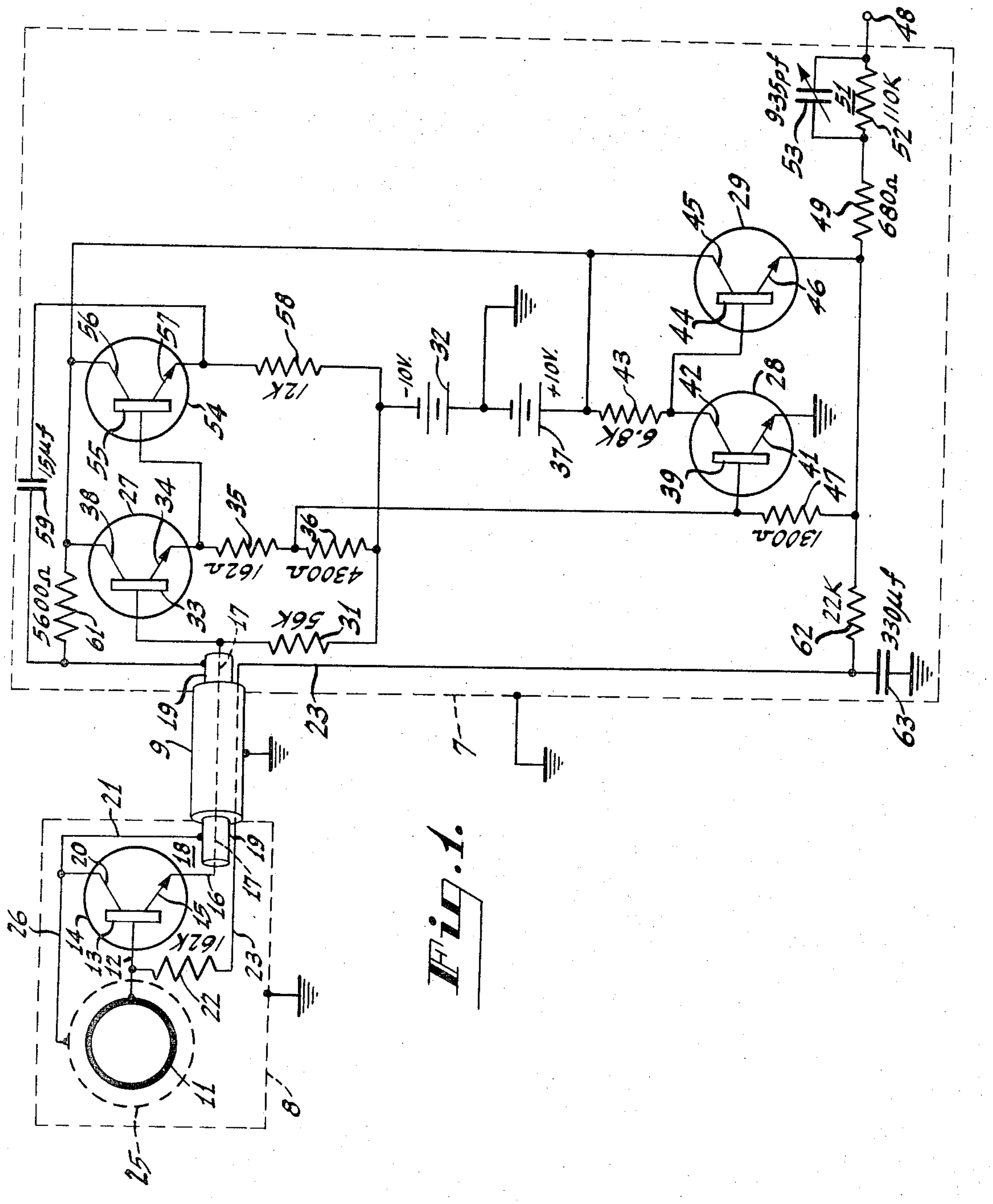
FIGURE 1 is a schematic circuit diagram of an illustrative embodiment of the invention.

Reference first will be made to FIGURE 1 of the drawings. The apparatus embodying the invention is divided between a main chassis 7 and a housing 8 for the vidicon pickup tube both of which are grounded. Connections between the chassis 7 and the housing 8 are made by suitable conductors through a grounded conduit 9 extending from the housing to the chassis. The target ring or signal output electrode 11 of the vidicon is connected by a short conductor 12 to the input base electrode 13 of an input transistor 14. The output emitter electrode 15 of this transistor is connected by a lead 16 to the inner conductor 17 of a connecting cable 18 which also is provided with a metallic shield 19 and which extends through, but is insulated from, the conduit 9. The collector electrode 20 of the input transistor 14 is connected by a conductor 21 to the shield 19 of the connecting cable 18 by means of which it is connected to other components on the main chassis 7 as subsequently described. A resistor 22 by which a biasing potential is applied to the base 13 of the transistor 14 is connected by a conductor 23 to the main preamplifier apparatus in chassis 7. The biasing conductor 23 is shielded by and insulated from the conduit 9 and extends through to the main chassis 7 where it is connected to apparatus mounted thereon in a manner to be described. The conduit 9 is electrically connected at its respective ends to the chassis 7 and to the housing 8, all of which apparatus is grounded.

In a particular embodiment of the invention the vidicon target ring 11 may be surrounded by a shield 25 in the form of a circular metallic strip which is electrically connected by a conductor 26 to the collector electrode 20 of the transistor 14 and to the outer shield 19 of the connecting cable 18 for a particular purpose to be described subsequently.

The main chassis 7 of the preamplifier includes a signal take-off transistor 27 as an additional current amplifying stage for the video signal and a feedback pair of transistors 28 and 29 serving as a video signal voltage amplifier stage. The input transistor 14 is operated as an emitter follower by a resistor 31 connected at one of its terminals to the emitter electrode 15 of the transistor 14 by the conductor 17 and at the other of its terminals to a source of negative voltage represented by the grounded battery 32. The video signal developed across the resistor 31 is impressed upon the base electrode 33 of the transistor 27 which is operated as an emitter follower and current amplifier by the connection of its emitter electrode 34 through resistor 35 to the low impedance input of the feedback pair of transistors 28 and 29. Negative base bias for transistor 28 is supplied by resistor 36 from the negative voltage supply 32. Positive voltage derived from a source represented by the grounded battery 37 is applied to the collector electrode 38 of the transistor 27.

Substantially all of that video signal current passed through resistor 35 is applied to the base electrode 39 of transistor 28, the emitter electrode 41 of which is grounded and the collector electrode 42 of which is connected through a load resistor 43 to the positive voltage source 37. The video signal voltage developed across the load resistor 43 is applied to the base electrode 44 of the second transistor 29 of the feedback pair the collector electrode 45 of which is connected directly to the positive voltage source 37 and the emitter electrode 46 of which is connected in a feedback circuit including a resistor 47 to the base electrode 39 of the transistor 28. The preamplified video signal appearing at the emitter electrode 46 of transistor 29 is applied to an output terminal 48 by a resistor 49 and a peaking circuit 51 including a parallel connection of a resistor 52 and a variable capacitor 53.

The preamplifier chassis 7 also includes a feedback transistor 54, the base electrode 55 of which is connected in a signal-receiving manner to the emitter electrode 34 of the transistor 27. The collector electrode 56 of the transistor 54 is connected directly to the positive voltage supply 37 and the emitter electrode 57 is connected through a resistor 58 to the negative voltage supply 32. The emitter electrode 57 of this transistor also is AC coupled by a capacitor 59 to the collector electrode 20 of the input transistor 14 by way of the shield 19 of the cable 18 interconnecting the chassis 7 and the vidicon housing 8. The purpose of this connection is to supplement other arrangements, all of which will be described in detail subsequently, to reduce the effective input circuit capacitance of the input transistor 14.

Operating voltage from the positive voltage supply 37 is applied to the collector electrode 20 of the input transistor 14 by means including a resistor 61 and the interconnecting cable shield 19. Biasing potential for application by resistor 22 to the base electrode 13 of the input transistor 14 is obtained by connecting the conductor 23 at its chassis 7 end to a filter network comprising a resistor 62 and a capacitor 63, the network being connected to the emitter electrode 46 of the transistor 29 and functioning with the transistors to produce a unidirectional voltage from the amplified video signal.

Figure 3:
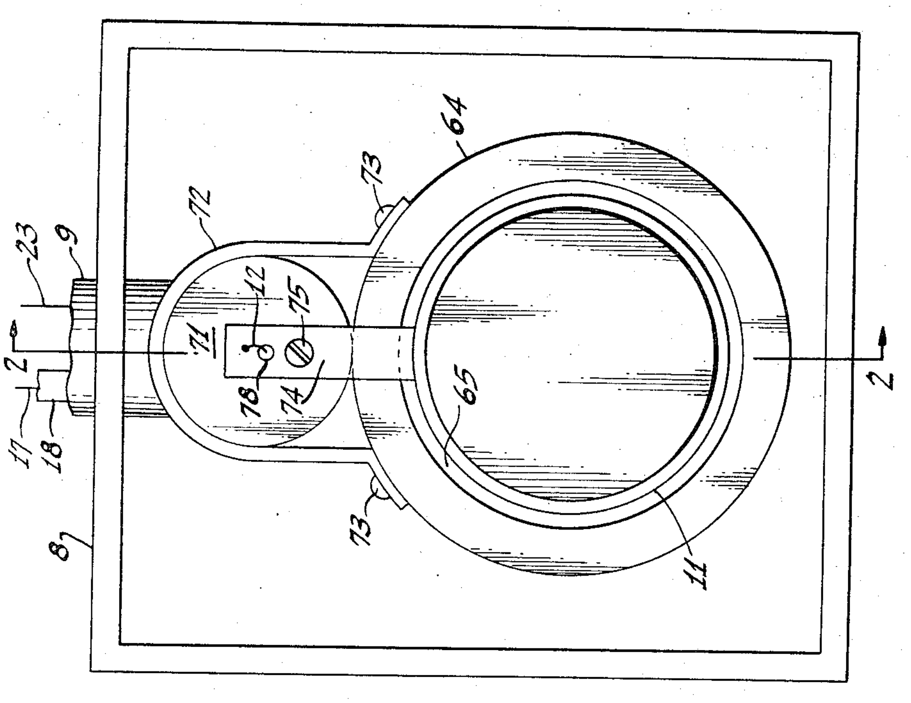
FIGURE 3 is an end view of the vidicon housing and the cable containing the preamplifier input stage.
Figure 2:
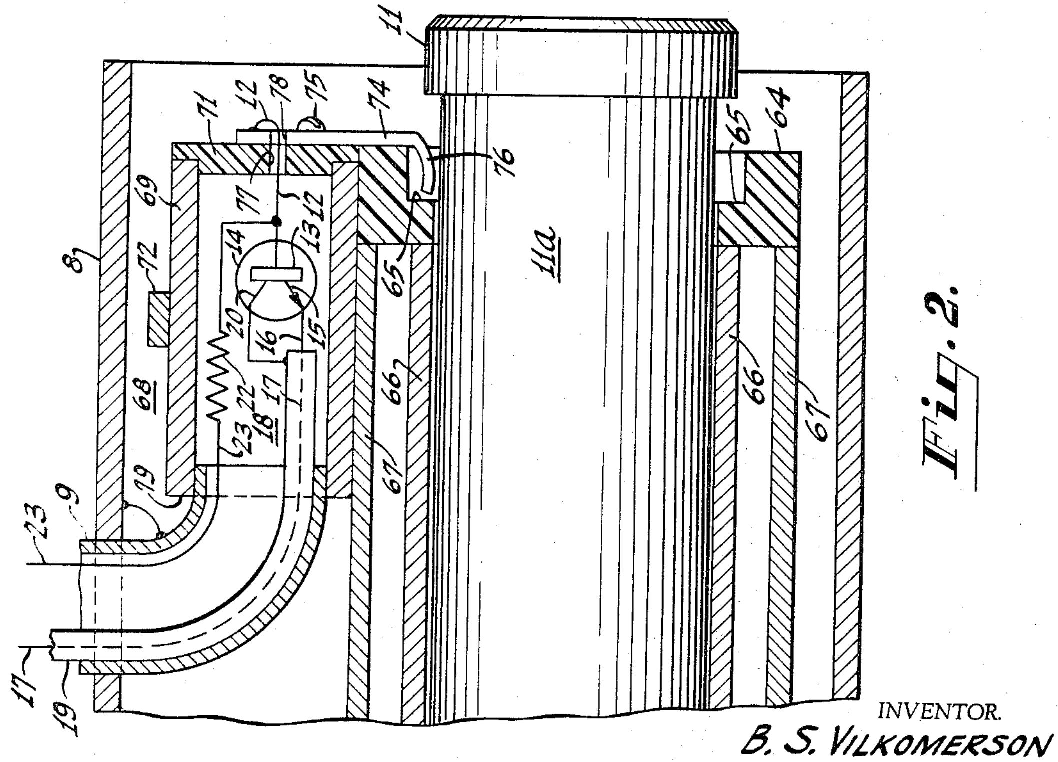
FIGURE 2 is a fragmentary view, partly in cross-section, of the housing for a vidicon pickup tube and showing one manner in which the input stage of the preamplifier embodying the invention may be mounted in relatively close proximity to the target electrode of the vidicon.

Reference now will be made to FIGURES 2 and 3 for a description of the mounting of the input stage of the preamplifier relative to the vidicon image pickup tube. The vidicon pickup tube 11*a* is shown somewhat withdrawn from its operating position in its mounting so as to better illustrate the manner in which an electrical connection is made to the output target ring 11. The mounting includes a ring 64 of insulating material having a shoulder 65 against which the target ring 11 rests when the tube is fully mounted for operation. The main body of the vidicon 11*a* is supported rearwardly of the target ring 11 by means such as a cylindrical support 66 which in turn is surrounded by another cylindrical yoke housing 67 spaced therefrom to provide space for the mounting and enclosure of the necessary coils such as deflection and focusing windings and the like by which the vidicon is operated.

The input stage of the preamplifier is mounted in a small cylindrical enclosure 68 having a tubular side wall 69 and an insulating disc 71 at the forward end thereof. The enclosure 68 is mounted on, and secured by a strap or band 72 to, the yoke housing 67 by any suitable means such as a plurality of screws 73. At the forward end of the enclosure 68 a metallic conductor strip 74 is attached to the insulating disc 71 by means such as a screw 75. The strip 74 has a contact 76 at its extremity which extends into the annular recess formed in the insulator 64 forward of the shoulder 65. When the vidicon 11*a* is fully inserted into its mounting the periphery of the target ring 11 is pressed into engagement with the contact 76 which then serves as an electrical output from the vidicon.

The input stage transistor 14, the base biasing resistor 22, and the interconnecting cable 18 are mounted inside of the cylindrical enclosure 68. The conductor 12 extending from the base electrode 13 of the transistor 14 extends through a hole 77 in the insulating disc 71 and through a hole 78 in the strip 74 and is connected electrically and mechanically by means such as solder to the conducting strip 74.

The entire structure including the vidicon 11*a* and its auxiliary components together with the pickup stage transistor and its enclosure 68 are mounted within the housing 8. The conduit 9 which extends from the vidicon pickup apparatus to the main chassis 7 of the preamplifier, as schematically indicated in FIGURE 1, terminates at the rear end 79 of the enclosure 68 and extends outwardly therefrom through an opening in the housing 8. The conduit 9 is also electrically connected to the housing 8 which is grounded as previously described. Also, the interconnecting cable 18 extends through an appropriate opening in the rear end 79 of the enclosure 68, thence through and insulated from, the conduit 9 and to the main chassis 7 as previously described. Similarly the conductor 23 leading from the base biasing resistor 22 extends through, is shielded by, and is insulated from, the conduit 9.

Having described the components of the video signal preamplifier embodying this invention, their interconnections and the physical relationship of some of them to the vidicon pickup tube, there now will be described the manner in which the combination of certain ones of these features results in the production of a video signal preamplifier for use with a photoconductive pickup tube, such as a vidicon, which produces a signal-to-noise ratio at least as good as that presently obtainable using electron tubes in the preamplifier. As previously discussed, the signal obtained from the vidicon is relatively small and, therefore, the signal voltage available for further amplification is determined by the capacitive reactance of the input circuit of the amplifier. Various features of the present arrangement individually and collectively operate to reduce the input circuit capacitive reactance so as to enable the practical use of transistors in the video signal preamplifier.

One of these features is the physical placement of the input stage transistor very close to the output electrode of the vidicon pickup tube. In one practical embodiment of the invention the input stage transistor 14 is a low noise, expitaxial NPN, high beta, low current transistor such as a 2N2484 type for example. As previously described, this transistor is connected as an emitter follower. Advantage is taken of the small physical size of the transistor including its enclosing can which is about two tenths of an inch in diameter and about two tenths of an inch in length and the fact that it draws only one-fifth of a milliampere of current and, therefore, produces no appreciable heat. It, thus, is feasible to mount it in the vidicon housing 8 as illustrated in FIGURES 2 and 3 in such position that the input lead to the base 13 of the transistor 14 is very short, for example not more than an inch. Because of the short length of the input lead comprising conductor 12 and the metallic connecting strip 74 it is unnecessary to provide shielding of the input lead. In the past, where the input stage of the preamplifier was more remotely located relative to the vidicon pickup tube, the connection between the target ring of the vidicon and the input circuit of the preamplifier was made by means of a shielded cable. In a length of such shielded cable the video signal-carrying conductor has distributed capacitance relative to the shield of the cable. Thus, by eliminating the use of such a cable, such capacitance is eliminated, thereby materially decreasing the capacitive reactance of the input circuit of the transistor 14.

The input circuit capacitive reactance is further decreased by means of the AC coupling of the emitter electrode 57 of the feedback transistor 54 to the collector electrode 20 of the input stage transistor 14. This coupling is effected by way of the capacitor 59, the metallic shield 19 of the interconnecting cable 18 and conductor 21. This coupling function to reduce the effective capacitance of the collector electrode 20 of the input stage transistor 14 and of the metallic shield 19 surrounding the output conductors 16 and 17 from the emitter electrode 15 of the transistor 14. Although the voltage developed at the emitter electrode 34 of transistor 27 is suitable for capacitive coupling to the collector electrode 20 of the input stage transistor 14 by means including the capacitor 59, it is desirable to provide the feedback and at the same time to decouple the circuit capacitances associated with capacitor 59, namely, the transistor 14 collector capacitance, the shield 19 capacitance to ground, and the vidicon ring shield 25, from the emitter electrode 34 by means including the feedback transistor 54. Otherwise, the abovementioned circuit capacitances associated with the capacitor 59 would effectively by-pass high frequencies around resistor 35 and cause disproportionately large high frequency current components to be fed to the base electrode 39 of transistor 28 to which it is desired to supply a virtually undistorted video signal current. By using the feedback transistor 54 and thereby decoupling these capacitances from the emitter electrode 34 of transistor 28, there is avoided such high frequency by-passing and resultant signal distortion.

By the combination of these features the effective capacitive reactance of the input circuit of the transistor 14 is reduced to about one-third of the corresponding capacitive reactance when an electron tube is used as the input stage of the preamplifier. The signal available at the input of the transistor 14, therefore, is correspondingly increased in magnitude so that the noise or spurious signal introduced in this stage by the use of the transistor can be tolerated and the resultant output signal-to-noise ratio is in no case less than that obtainable previously with the use of an electron tube as the input stage of a video signal preamplifier, when a photoconductive type of pickup tube is used.

Because of the proximity of the target ring 11 of the vidicon **11*a* to certain auxiliary apparatus such as the deflecting coils mounted in the space between the cylindrical support 66 and the yoke housing 67 there may be spurious signals derived from the deflection windings and undesirably mixed with the desired viedo signals. Such spurious signals may be excluded from the video signals by using a metallic ring such as the target shield 25 shown schematically in FIGURE 1. It effectively eliminates any capacitance which may exist between the vidicon target ring 11 and the surrounding housing 8** which is connected to ground.

By driving the various shields associated with such apparatus to the same voltage as the signal input voltage there is effectively no capacitance loading placed upon the shielded elements. By means of the circuitry including the feedback capacitor 59, there is practically no capacity current which tends to flow between the shielded elements and their shields, such as for example, between the conductor 17 of the interconnecting cable 18 and its shield 19.

It also has been found beneficial to supply direct current feedback to the base electrode 13 of the input stage transistor 14 from the emitter electrode 46 of the output transistor 29 of the feedback pair of transistors 28 and 29. It has been found that with the relatively large DC negative feedback provided by the disclosed arrangement there is no appreciable change of biasing for the base electrode 13 of the input stage transistor 14 with variations in temperature despite the fact that a relatively high value resistor 22 is used. It has been found desirable to provide this relatively high base electrode resistance in order to develop the proper amount of low frequency signal output from the transistor 14 to match the increased high frequency signal output achieved by reason of the described lowering of the effective input capacitance of this stage.

In one successfully operated circuit of the character described the various component had the values indicated in the drawings. This circuit also used the following transistor types:

| | |
|---|---|
| Transistor **14** | 2N2484 |
| Transistor **27** | 2N2222 |
| Transistor **28** | 2N2222 |
| Transistor **29** | 2N706–A |
| Transistor **54** | 2N706–A |

It is to be understood that such circuit data is given by way of example only and should not be treated as limiting of the invention defined in the following claims.

What is claimed is:

1. In combination with a relatively low level, wideband signal-producing source, an amplifier comprising:

a signal input stage including a first transistor having base, emitter and collector electrodes and connected for emitter-follower operation with its base electrode coupled in signal-receiving manner to said signal source;

a signal take-off stage including a second transistor having base, emitter and collector electrodes and connected for current amplifier and emitter-follower operation with its base electrode coupled in signal-receiving manner to the emitter of said input stage transistor;

a feedback stage including a third transistor having base, emitter and collector electrodes and connected for emitter-follower operation with its base electrode coupled in signal-receiving manner to the emitter of said signal take-off stage transistor;

a feedback capacitor connected between the emitter of said feedback stage transistor and the collector of said input stage transistor; and means coupled in signal-receiving manner to the emitter of said signal take-off stage transistor to further amplify said signals.

2. In combination with a relatively low level video signal-producing source, an amplifier comprising:

a signal input stage including a first transistor having base, emitter and collector electrodes and connected for emitter-follower operation with its base electrode coupled in signal-receiving manner to said signal source;

a signal take-off stage including a second transistor having base, emitter and collector electrodes and connected for current amplifier and emitter-follower operation with its base electrode coupled in signal-receiving manner to the emitter of said input stage transistor;

a feedback stage including a third transistor having base, emitter and collector electrodes and connected for emitter-follower operation with its base electrode coupled in signal-receiving manner to the emitter of said signal take-off stage transistor;

a feedback capacitor connected between the emitter of said feedback stage transistor and the collector of said input stage transistor;

means coupled in signal-receiving manner to the emitter of said signal take-off stage transistor to further amplify said signals;

means connected to said further amplifying means to develop a unidirectional voltage from said signals; and means connected said unidirectional voltage-developing means to the base of said input stage transistor to apply said unidirectional voltage as a base bias for said input stage transistor.

3. In combination with a video signal-producing photoconductive image pickup tube, an amplifier comprising:

a signal input stage including a first transistor having a base coupled in signal-receiving manner to said pickup tube, a collector connected through a first resistor to a source of potential, and an emitter connected through a second resistor to said source of potential;

a signal take-off stage including a second transistor having a base coupled in signal-receiving manner to the emitter of said input stage transistor, a collector connected directly to said source of potential, and an emitter connected through a pair of serially connected third and fourth resistors to said source of potential;

a feedback stage including a third transistor having a base coupled in signal-receiving manner to the emitter of said signal take-off stage transistor, a collector connected directly to said source of potential, and an emitter connected through a fifth resistor to said source of potential;

a feedback capacitor connected between the emitter of said feedback stage transistor and the collector of said input stage transistor;

means coupled in signal-receiving manner to the junction point of said serially connected third and fourth resistors to further amplify said video signals;

means including a resistive-capacitive network connected to said further amplifying means to develop a unidirectional voltage; and means including a sixth resistor connecting said unidirectional voltage-developing means to the base of said input stage transistor to apply said unidirectional voltage as a base bias for said input stage transistor.

4. In combination with a video signal-producing vidicon pickup tube, an amplifier comprising:

a signal input stage including a first NPN transistor having a base coupled in signal-receiving manner to said vidicon, a collector connected through a first resistor to a source of positive potential, and an emitter connected through a second resistor to a source of negative potential;

a signal take-off stage including a second NPN transistor having a base coupled in signal-receiving manner to the emitter of said input stage transistor, a collector connected directly to said source of positive potential, and an emitter connected through a pair of serially connected third and fourth resistors to said source of negative potential;

a feedback stage including a third NPN transistor having a base coupled in signal receiving manner to the emitter of said signal take-off stage transistor, a collector connected directly to said source of positive potential, and an emitter connected through a fifth resistor to said source of negative potential;

a feedback capacitor connected between the emitter of said feedback stage transistor and the collector of said input stage transistor;

means including a feedback pair of NPN transistors coupled in signal receiving manner to the junction point of said serially connected third and fourth resistors to further amplify said video signals;

means including a resistive-capacitive network connected to one of said feedback pair of transistors to develop a unidirectional voltage; and means including a sixth resistor connecting said unidirectional voltage-developing means to the base of said input stage transistor to apply said unidirectional voltage as a base bias for said input stage transistor.

5. In a television camera, video signal generating and amplifying apparatus comprising:

a photoconductive image pickup tube having a target ring adjacent one end and constituting an output terminal for video signals generated by said tube;

a housing to mount and enclose said pickup tube;

an input signal amplifying stage including a transistor having base, emitter and collector electrodes and connected for emitter-follower operation;

an enclosure for said input signal amplifying stage mounted on said housing adjacent to said pickup tube target ring;

short conductor means having a minimum distributed capacitance connecting said target ring to the input base electrode of said transistor;

a main chassis separate and spaced from said pickup tube housing and including further video signal amplifying means;

a cable including an inner conductor connecting the output emitter electrode of said input stage transistor to said further amplifying means, said cable also having an outer shield surrounding said inner conductor and connected to the collector electrode of said input stage transistor, a shielding conduit surrounding said cable between, and electrically connected to, said input signal amplifying stage enclosure and said main chassis; and capacitive feedback means from said further amplifying means on said chassis to the collector electrode of said input stage transistor and including the outer shield of said cable, whereby to apply a voltage to said input stage collector electrode and to the shield of said cable which is substantially the same as the video signal voltage and thus to minimize the effective capacitive reactance of the input circuit of said input signal amplifying stage.

6. In a television camera, video signal generating and amplifying apparatus comprising:

a photoconductive image pickup tube having a target ring adjacent one end and constituting an output terminal for video signals generated by said tube;

a housing to mount and enclose said pickup tube;

an input signal amplifying stage including a transistor having base, emitter and collector electrodes and connected for emitter-follower operation;

an enclosure for said input signal amplifying stage mounted on said housing adjacent to said pickup tube target ring;

short conductor means having a minimum distributed capacitance connecting said target ring to the base electrode of said transistor;

a main chassis separate and spaced from said pickup tube housing and including further video signal amplifying means;

a cable including an inner conductor connecting the emitter electrode of said input stage transistor to said further amplifying means, said cable also having an outer shield surrounding said inner conductor and connected to the collector electrode of said input stage transistor, a shielding conduit surrounding said cable and extending between said input signal amplifying stage enclosure and said main chassis;

means connecting said housing, said enclosure, said main chassis and said shielding conduit to the same reference potential point; and capacitive feedback means from said further amplifying means on said chassis to the collector electrode of said input stage transistor and including the outer shield of said cable, whereby to apply a voltage to said input stage collector electrode and to the shield of said cable which is substantially the same as the video signal voltage and thus to minimize the effective capacitive reactance of the input circuit of said input signal amplifying stage.

7. In a television camera, video signal generating and amplifying apparatus comprising:

a vidicon image pickup tube having a target ring adjacent one end and constituting an output terminal for video signals generated by said tube;

a grounded housing to mount and enclose said vidicon;

an input signal amplifying stage including a transistor having base, emitter and collector electrodes and connected for emitter-follower operation;

a grounded enclosure for said input signal amplifying stage mounted on said housing adjacent to said vidicon target ring;

short conductor means having a minimum capacitance to ground connecting said target ring to the base electrode of said transistor;

a grounded main chassis separate and spaced from said vidicon housing and including further video signal amplifying means;

a cable including an inner conductor connecting the emitter electrode of said input stage transistor to said further amplifying means, said cable also having an outer shield surrounding said inner conductor and connected to the collector electrode of said input stage transistor, a grounded shielding conduit surrounding said cable and extending between said input signal amplifying stage enclosure and said main chassis; and capacitive feedback means from said further amplifying means on said chassis to the collector electrode of said input stage transistor and including the outer shield of said cable, whereby to apply a voltage to said input stage collector electrode and to the shield of said cable which is substantially the same as the video signal voltage and thus to minimize the effective capacitive reactance of the input circuit of said input signal amplifying stage.

8. In combination with a video signal-producing photoconductive image pickup tube, an amplifier comprising:

a signal input transistor, a signal takeoff transistor and a feedback transistor, each transistor having base, emitter and collector electrodes;

means connecting the collector and emitter electrodes of said respective transistors to a source of potential;

means coupling in signal-receiving manner the base of said input transistor to said pickup tube, the base of said takeoff transistor to the emitter of said input transistor, and the base of said feedback transistor to the emitter of said takeoff transistor; and means capacitively coupling the emitter of said feedback transistor to the collector of said input transistor.

9. In combination with a video signal-producing vidicon pickup tube, an amplifier comprising:

a signal input transistor, a signal takeoff transistor and a feedback transistor, each transistor having base, emitter and collector electrodes;

means connecting the collector and emitter electrodes of said respective transistors to a source of potential;

means coupling in signal-receiving manner the base of said input transistor to said vidicon, the base of said takeoff transistor to the emitter of said input transistor, and the base of said feedback transistor to the emitter of said takeoff transistor;

means capacitively coupling the emitter of said feedback transistor to the collector of said input transistor; and means coupled between the emitter of said takeoff transistor and the base of said input transistor to develop for, and to apply to, the base of said input transistor a bias potential derived from said video signals.

References Cited

Rheinfelder: Design of Low Noise Transistor Input Circuits, pp. 125–127, published Jan. 30, 1964. TK 7872 T73R44.

JOHN W. CALDWELL, *Acting Primary Examiner.*

DAVID G. REDINBAUGH, *Examiner.*

R. L. RICHARDSON, *Assistant Examiner.*